(12) United States Patent
Kuribayashi et al.

(10) Patent No.: US 6,362,124 B1
(45) Date of Patent: Mar. 26, 2002

(54) CATALYST COMPONENT, CATALYST FOR OLEFIN POLYMERIZATION AND PROCESS FOR PRODUCING OLEFIN POLYMER

(75) Inventors: Hiroshi Kuribayashi; Makoto Satoh, both of Ichihara (JP)

(73) Assignee: Sumitomo Chemical Co., Ltd., Osaka (JP)

(*) Notice: Subject to any disclaimer, the term of this patent is extended or adjusted under 35 U.S.C. 154(b) by 0 days.

(21) Appl. No.: 09/504,779

(22) Filed: Feb. 15, 2000

(30) Foreign Application Priority Data

Feb. 25, 1999 (JP) ............................................ 11-048883

(51) Int. Cl.[7] .................................................. B01J 31/00
(52) U.S. Cl. ...................... 502/116; 502/103; 502/133; 502/104; 526/128; 526/125.1; 526/124.3; 526/136; 526/139; 526/125.3; 526/114; 526/124.1; 526/158
(58) Field of Search ............................... 502/116 S, 103, 502/133, 104; 526/128, 125.1, 124.3, 136, 159, 125.3, 114, 124.1, 158

(56) References Cited

FOREIGN PATENT DOCUMENTS

| | | | |
|---|---|---|---|
| EP | 0 641 807 | * | 3/1995 |
| EP | 0 844 260 | * | 5/1998 |
| EP | 0 844 260 A1 | | 5/1998 |
| JP | A 8-59730 | | 3/1996 |
| JP | 10-147610 | | 6/1998 |
| JP | 10-147611 | * | 6/1998 |
| JP | 11-35620 | | 2/1999 |
| JP | 11-035620 | * | 2/1999 |

* cited by examiner

*Primary Examiner*—David W. Wu
*Assistant Examiner*—Ling-Siu Choi
(74) *Attorney, Agent, or Firm*—Stevens, Davis, Miller & Mosher, L.L.P.

(57) ABSTRACT

There are provided (i) a catalyst component (C), (ii) an olefin polymerization catalyst, and (iii) a process for producing an olefin polymer. The catalyst being obtained by contacting a solid catalyst component (A), an organoaluminum compound (B) and the catalyst component (C) of an organosilicon compound represented by the following formula (1),

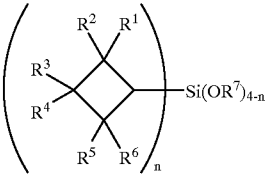

(1)

wherein n is 1 or 2, $R^1$ to and $R^6$ are independently of one another a hydrogen or halogen atom or a hydrocarbon group, or may be bonded with one another to form a ring, $R^7$ is a hydrocarbon group, and when n is 2, two $R^1$s, $R^2$s, $R^3$s, $R^4$s, $R^5$s and $R^6$s may be the same or different.

4 Claims, No Drawings

CATALYST COMPONENT, CATALYST FOR OLEFIN POLYMERIZATION AND PROCESS FOR PRODUCING OLEFIN POLYMER

FIELD OF THE INVENTION

The present invention relates to a component for producing an olefin polymerization catalyst, which component is hereinafter referred to as "catalyst component", an olefin polymerization catalyst, and a process for producing an olefin polymer. More specifically, the present invention relates to (i) a catalyst component of a specific organosilicon compound, (ii) an olefin polymerization catalyst obtained using said catalyst component, which catalyst has a superior polymerization activity and a superior stereospecific polymerization efficiency in olefin polymerization, and which catalyst is suitable for obtaining an olefin polymer having an extremely low content of amorphous polymers even when hydrogen is used as a molecular weight regulator, and (iii) a process for producing an olefin polymer using said catalyst.

BACKGROUND OF THE INVENTION

It is well known that a polymer of an α-olefin such as propylene and butene-1 can be produced by polymerizing an α-olefin with the aid of a catalyst obtained by contacting a titanium-containing solid catalyst component with an organoaluminum compound as a promoter, which catalyst is so-called Ziegler-Natta catalyst.

The α-olefin polymer obtained by such a process usually contains an amorphous α-olefin polymer of industrially low utility value, as well as a highly stereospecific α-olefin polymer of industrially high utility value. The amorphous α-olefin polymer greatly affects mechanical properties of products such as injection-molded products, films and fibers, which are made from the α-olefin polymer. In addition, the production of the amorphous polymer results in a loss of the α-olefin monomer, and moreover requires any equipment for removing the amorphous polymer from the α-olefin polymer. It is greatly disadvantageous from an industrial point of view. Accordingly, with respect to a catalyst used for producing an α-olefin polymer, it is desirable to produce no or an extremely small amount of an amorphous polymer as a by-product.

As a catalyst capable of giving a high stereospecificity and polymerization activity, which are satisfied to a certain extent, there is known a catalyst obtained by contacting a supported-type solid catalyst component, an organoaluminum compound as a promoter and an organosilicon compound as a third component. Said supported-type solid catalyst component is obtained by supporting a tetravalent titanium halide on a magnesium halide particle (JP-A 57-63310, JP-A 58-83006 and JP-A 61-78803).

Further, as another catalyst capable of giving a high stereospecificity and polymerization activity, which are satisfied to a certain extent, there is known a catalyst obtained by contacting a solid catalyst component, an organoaluminum compound as a promoter and an electron donor compound as a third component. Said solid catalyst component is obtained by reacting an organomagnesium compound with a silicon halide compound in the presence of an ether compound to produce a solid product and then treating the solid product with an ester compound and titanium tetrachloride (JP-A 54-112983 and JP-A 56-30407).

As a third component used for the production of aforementioned catalysts, there are known tetraethoxysilane, phenyltriethoxysilane, diphenyldimethoxysilane and a cyclohexyl group-carrying compound; an alkoxysilane having a bond between a cyclopentyl group having a substituent at a specific position and a silicon atom (JP-A 8-59730); a cyclopropyl group-carrying alkoxysilane and a dicycloalkyldialkoxysilane wherein said two cycloalkyl groups are different from each other in their carbon atom numbers (JP-A 10-147610 and JP-A 10-147611); and a silicon compound having a cyclic hydrocarbon group, a branched hydrocarbon group and two alkoxy groups different from each other (JP-A 11-35620).

Each of the references referred to above is incorporated herein by reference in its entirety.

However, the aforementioned catalysts and the α-olefin polymer obtained with the aid of such catalysts are not yet satisfactory in their polymerization activity and stereospecificity, respectively, and further improvements thereof are expected. Particularly, in utilities such as injection-molded products, for which high rigidity α-olefin polymers are desired, it is earnestly required to develop both a catalyst having a high stereospecific polymerization efficiency and a high stereospecific polymer.

Recently, from a view point of high-speed processability of an α-olefin polymer, it is also desired to obtain a catalyst capable of suppressing by-production of amorphous polymers and easily regulating the molecular weight of an α-olefin polymer. In the field of high-speed processing, the lower the molecular weight of an α-olefin polymer, the better flowability at the time of melt-processing. Therefore, it is desired to obtain an α-olefin polymer which has a low content of amorphous polymers and has a low molecular weight.

SUMMARY OF THE INVENTION

Accordingly, an object of the present invention is to provide an olefin polymerization catalyst, which has a high polymerization activity and has a high stereospecificity so that no removal of amorphous polymers is required, and moreover which can regulate the molecular weight of olefin polymers without lowering the stereospecificity thereof.

Another object of the present invention is to provide a catalyst component of a specific organosilicon compound used for producing said catalyst.

A further object of the present invention is to provide a process for producing an olefin polymer using said catalyst.

The present inventors have undertaken extensive studies relating to olefin polymerization to accomplish the aforementioned objects. As a result, it has been found that a specific organosilicon compound can accomplish the objects, and thereby the present invention has been obtained.

The present invention provides a catalyst component (C) for olefin polymerization, which is an organosilicon compound represented by the following formula (1),

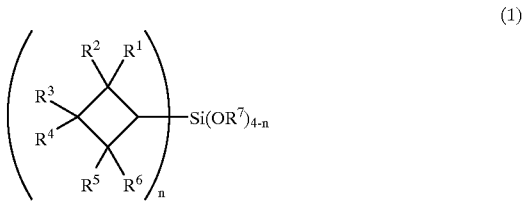

wherein n is 1 or 2; $R^1$, $R^2$, $R^3$, $R^4$, $R^5$ and $R^6$ are independently of one another a hydrogen atom, a halogen atom or a hydrocarbon group, or may be bonded with one another to form a ring; $R^7$ is a hydrocarbon group; and when n is 2, two $R^1$s, $R^2$s, $R^3$s, $R^4$s, $R^5$s and R6s may be the same or different.

The present invention also provides a catalyst for olefin polymerization, which is obtained by a process comprising the step of contacting:

a solid catalyst component (A) containing a magnesium atom, a titanium atom, a halogen atom and an electron donor compound;

an organoaluminum compound (B); and a catalyst component (C), which is an organosilicon compound represented by the foregoing formula (1).

The present invention further provides a process for producing an olefin polymer comprising the step of polymerizing an olefin in the presence of said catalyst.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

In the present invention, the term "polymerization" means copolymerization as well as homopolymerization, and the term "polymer" means a copolymer as well as a homopolymer.

An organosilicon compound used as the catalyst component (C) in accordance with the present invention is the one represented by the foregoing formula (1).

The symbols, $R^1$ $R^2$, $R^3$, $R^4$, $R^5$ and $R^6$ in the formula (1) are preferably independently of one another a hydrogen atom, a halogen atom, an alkyl group having 1 to 20 carbon atoms, a cycloalkyl group having 3 to 20 carbon atoms, an aryl group having 6 to 20 carbon atoms or an aralkyl group having 7 to 20 carbon atoms. Of these, more preferable are a hydrogen atom, an alkyl group having 1 to 10 carbon atoms and a cycloalkyl group having 3 to 10 carbon atoms, and much more preferable are a hydrogen atom, an alkyl group having 1 to 6 carbon atoms and a cycloalkyl group having 3 to 6 carbon atoms. A hydrogen atom is particularly preferable.

The symbol, $R^7$ in the formula (1) is a hydrocarbon group, preferably an alkyl group having 1 to 20 carbon atoms, and more preferably a methyl or ethyl group. A methyl group is particularly preferable.

As examples of the organosilicon compound represented by the formula (1), wherein n is 1, in other words, in the case where the compound has one cyclobutyl group or its derivative group, there are enumerated cyclobutyltrimethoxysilane,
2-methylcyclobutyltrimethoxysilane,
3-methylcyclobutyltrimethoxysilane,
2-ethylcyclobutyltrimethoxysilane,
3-ethylcyclobutyltrimethoxysilane,
2-propylcyclobutyltrimethoxysilane,
3-propylcyclobutyltrimethoxysilane,
2-butylcyclobutyltrimethoxysilane,
3-butylcyclobutyltrimethoxysilane,
2-phenylcyclobutyltrimethoxysilane,
3-phenylcyclobutyltrimethoxysilane,
cyclobutyltriethoxysilane,
2-methylcyclobutyltriethoxysilane,
3-methylcyclobutyltriethoxysilane,
2-ethylcyclobutyltriethoxysilane,
3-ethylcyclobutyltriethoxysilane,
2-propylcyclobutyltriethoxysilane,
3-propylcyclobutyltriethoxysilane,
2-butylcyclobutyltriethoxysilane,
3-butylcyclobutyltriethoxysilane,
2-phenylcyclobutyltriethoxysilane and
3-phenylcyclobutyltriethoxysilane.

As examples of the organosilicon compound, wherein n is 2, in other words, in the case where the compound has two cyclobutyl groups or its derivative groups, there are enumerated dicyclobutyldimethoxysilane, di(2-methylcyclobutyl)dimethoxysilane, di(3-methylcyclobutyl)dimethoxysilane, bis(2,3-dimethylcyclobutyl)dimethoxysilane, bis(2,2-dimethylcyclobutyl)dimethoxysilane, bis(3,3-dimethylcyclobutyl)dimethoxysilane, bis(2,4-dimethylcyclobutyl)dimethoxysilane, di(2-ethylcyclobutyl)dimethoxysilane, di(3-ethylcyclobutyl)dimethoxysilane, bis(2,3-diethylcyclobutyl)dimethoxysilane, bis(2,2-diethylcyclobutyl)dimethoxysilane, bis(3,3-diethylcyclobutyl)dimethoxysilane, bis(2,4-diethylcyclobutyl)dimethoxysilane, cyclobutyl(2-methylcyclobutyl)dimethoxysilane, cyclobutyl(3-methylcyclobutyl)dimethoxysilane, cyclobutyl(4-methylcyclobutyl)dimethoxysilane, cyclobutyl(2-phenylcyclobutyl)dimethoxysilane, cyclobutyl(3-phenylcyclobutyl)dimethoxysilane, cyclobutyl(4-phenylcyclobutyl)dimethoxysilane, cyclobutyl(2-ethylcyclobutyl)dimethoxysilane, cyclobutyl(3-ethylcyclobutyl)dimethoxysilane, cyclobutyl(4-ethylcyclobutyl)dimethoxysilane, 2-methylcyclobutyl(2-ethylcyclobutyl)dimethoxysilane, 3-methylcyclobutyl(3-ethylcyclobutyl)dimethoxysilane, 4-methylcyclobutyl(4-ethylcyclobutyl)dimethoxysilane, cyclobutyl(2-fluorocyclobutyl)dimethoxysilane, cyclobutyl(3-fluorocyclobutyl)dimethoxysilane, cyclobutyl(4-fluorocyclobutyl)dimethoxysilane, cyclobutyl(2-chlorocyclobutyl)dimethoxysilane, cyclobutyl(3-chlorocyclobutyl)dimethoxysilane, cyclobutyl(4-chlorocyclobutyl)dimethoxysilane,
dicyclobutyldiethoxysilane, di(2-methylcyclobutyl)dimethoxysilane, di(3-methylcyclobutyl)dimethoxysilane, bis(2,3-dimethylcyclobutyl)dimethoxysilane, bis(2,2-dimethylcyclobutyl)dimethoxysilane, bis(3,3-dimethylcyclobutyl)dimethoxysilane, bis(2,4-dimethylcyclobutyl)dimethoxysilane, di(2-ethylcyclobutyl)dimethoxysilane, di(3-ethylcyclobutyl)dimethoxysilane, bis(2,3-diethylcyclobutyl)dimethoxysilane, bis(2,2-diethylcyclobutyl)dimethoxysilane, bis(3,3-diethylcyclobutyl)dimethoxysilane, bis(2,4-diethylcyclobutyl)dimethoxysilane, cyclobutyl(2-methylcyclobutyl)dimethoxysilane, cyclobutyl( 3-methylcyclobutyl)dimethoxysilane, cyclobutyl(4-methylcyclobutyl)dimethoxysilane, cyclobutyl (2-ethylcyclobutyl)dimethoxysilane, cyclobutyl(3-ethylcyclobutyl)dimethoxysilane, cyclobutyl(4-ethylcyclobutyl)dimethoxysilane, 2-methylcyclobutyl(2-ethylcyclobutyl)dimethoxysilane, 3-methylcyclobutyl(3-ethylcyclobutyl)dimethoxysilane, 4-methylcyclobutyl(4-ethylcyclobutyl)dimethoxysilane, cyclobutyl(2-phenylcyclobutyl)dimethoxysilane, cyclobutyl(3-phenylcyclobutyl)dimethoxysilane, cyclobutyl(4-phenylcyclobutyl)dimethoxysilane, cyclobutyl(2-fluorocyclobutyl)

dimethoxysilane, cyclobutyl(3-fluorocyclobutyl) dimethoxysilane, cyclobutyl(4-fluorocyclobutyl) dimethoxysilane, cyclobutyl(2-chlorocyclobutyl) dimethoxysilane, cyclobutyl(3-chlorocyclobutyl) dimethoxysilane and cyclobutyl(4-chlorocyclobutyl) dimethoxysilane.

Further as examples of the organosilane compound in the case where some of $R^1$, $R^2$, $R^3$, $R^4$, $R^5$ and $R^6$ are bonded with one another to form a ring, there are enumerated (bicyclo[2.1.0]-2-pentyl)trimethoxysilane, (bicyclo[2.2.0]-2-hexyl)trimethoxysilane, (bicyclo[3.2.0]-6-heptyl)trimethoxysilane, (bicyclo[4.2.0]-7-octyl)trimethoxysilane, (bicyclo[5.2.0]-8-nonanyl)trimethoxysilane, (bicyclo[6.2.0]-9-decanyl)trimethoxysilane, di(bicyclo[2.1.0]-2-pentyl)dimethoxysilane, di(bicyclo[2.2.0]-2-hexyl)dimethoxysilane, di(bicyclo[3.2.0]-6-heptyl)dimethoxysilane, di(bicyclo[4.2.0]-7-octyl)dimethoxysilane, di(bicyclo[5.2.0]-8-nonanyl)dimethoxysilane, di(bicyclo[6.2.0]-9-decanyl)dimethoxysilane, (bicyclo[2.1.0]-2-pentyl)triethoxysilane, (bicyclo[2.2.0]-2-hexyl)triethoxysilane, (bicyclo[3.2.0]-6-heptyl)triethoxysilane, (bicyclo[4.2.0]-7-octyl)triethoxysilane, (bicyclo[5.2.0]-8-nonanyl)triethoxysilane, (bicyclo[6.2.0]-9-decanyl)triethoxysilane, di(bicyclo[2.1.0]-2-pentyl)dimethoxysilane, di(bicyclo[2.2.0]-2-hexyl)dimethoxysilane, di(bicyclo[3.2.0]-6-heptyl)dimethoxysilane, di(bicyclo[4.2.0]-7-octyl)dimethoxysilane, di(bicyclo[5.2.0]-8-nonanyl)dimethoxysilane and di(bicyclo[6.2.0]-9-decanyl)dimethoxysilane.

Although "n" in the formula (1) denotes 1 or 2, preferred is 2. Among the organosilane compounds in the case where n is 2, preferred examples thereof are dicyclobutyldimethoxysilane, di-sustituted-cyclobutyldimethoxysilane, dicyclobutyldiethoxysilane and di-substituted-cyclobutyldiethoxysilane; more preferred are dicyclobutyldimethoxysilane and di-sustituted-cyclobutyldimethoxysilane; and much more preferred is dicyclobutyldimethoxysilane.

The organosilicon compounds represented by the foregoing formula (1) can be produced by a method known in the art (JP-A 8-157482 and JP-A 9-12584), or are available from a manufacturer of such compounds. Each of the references referred to above is incorporated herein by reference in its entirety.

Catalyst for Olefin Polymerization

As a catalyst for olefin polymerization, which can be produced with use of the catalyst component (C), there is exemplified a catalyst, which is obtained by contacting a solid catalyst component (A) having at least a magnesium atom, a titanium atom, a halogen atom and a component derived from an electron donor compound; an organoaluminum compound (B); and the catalyst component (C).

The solid catalyst component (A) can be obtained, for example, by any of the following processes (i) and (ii):

(i) a process wherein a titanium compound (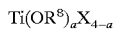) represented by the following formula is reduced with an organomagnesium compound (④) in the presence of an Si—O bond-carrying organosilicon compound (①), thereby obtaining a trivalent titanium atom-containing solid product (reduced solid product), and the solid product is treated with a halogen compound (⑤) of a metal belonging to groups 4 to 6 of the periodic table to obtain the solid catalyst component (A), $$Ti(OR^8)_a X_{4-a}$$

wherein $R^8$ is a hydrocarbon group having 1 to 20 carbon atoms, X is a halogen atom and "a" is a number satisfying $0<a\leq 4$; and (ii) a process wherein a titanium compound () and an electron donor compound (②) are supported on a magnesium compound (⑥) having no reducing power to obtain the solid catalyst component (A).

In the above-mentioned process (i), it is recommendable to use the organosilicon compound (①) in combination with the electron donor compound (②). As the solid catalyst component (A) used in the present invention, those obtained by the process (i) are preferred. With respect to the compounds (①) to (⑦), a detailed explanation is given as follows.

Organosilicon Compound (①)

As examples of the Si—O bond-carrying organosilicon compound (①), there is enumerated a silicate represented by the following formula, $$R^9_b Si(OR^{10})_{4-b}$$

wherein $R^9$ and $R^{10}$ are the same or different, and are a straight chain hydrocarbyl group, branched hydrocarbyl group or cyclic hydrocarbyl group having 1 to 20 carbon atoms, an aryl group having 6 to 20 carbon atoms or an aralkyl group having 7 to 20 carbon atoms, and b is a number satisfying $0 \leq b < 4$.

A preferred silicate is that of b=0, and a more preferred silicate is that having a straight chain alkyl group as $R^{10}$.

As examples of the silicate represented by the foregoing formula, there are enumerated tetramethoxysilane, tetraethoxysilane, tetrabutoxysilane, tetraphenoxysilane, methyltrimethoxysilane, ethyltrimethoxysilane, butyltrimethoxysilane, isobutyltrimethoxysilane, tert-butyltrimethoxysilane, isopropyltrimethoxysilane, cyclohexyltrimethoxysilane, phenyltrimethoxysilane, vinyltrimethoxysilane, dimethyldimethoxysilane, diethyldimethoxysilane, dipropyldimethoxysilane, propylmethyldimethoxysilane, diisopropyldimethoxysilane, dibutyldimethoxysilane, diisobutyldimethoxysilane, di-tert-butyldimethoxysilane, butylmethyldimethoxysilane, butylethyldimethoxysilane, tert-butylmethyldimethoxysilane, isobutylisopropyldimethoxysilane, tert-butylisopropyldimethoxysilane, hexylmethyldimethoxysilane, hexylethyldimethoxysilane, dodecylmethyldimethoxysilane, dicyclopentyldimethoxysilane, cyclopentylmethyldimethoxysilane, cyclopentylethyldimethoxysilane, cyclopentylisopropyldimethoxysilane, cyclopentylisobutyldimethoxysilane, cyclopentyl-tert-butyldimethoxysilane, dicyclohexyldimethoxysilane, cyclohexylmethyldimethoxysilane, cyclohexylethyldimethoxysilane, cyclohexylisopropyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-tert-butyldimethoxysilane, phenylcyclopentyldimethoxysilane, vinylmethyldimethoxysilane, methyltriethoxysilane, ethyltriethoxysilane, butyltriethoxysilane, isobutyltriethoxysilane, tert-butyltriethoxysilane, isopropyltriethoxysilane, cyclohexyltriethoxysilane, phenyltriethoxysilane, vinyltriethoxysilane, dimethyldiethoxysilane, diethyldiethoxysilane, dipropyldiethoxysilane, propylmethyldiethoxysilane, diisopropyldiethoxysilane, dibutyldiethoxysilane, diisobutyldiethoxysilane, di-tert-butyldiethoxysilane, butylmethyldiethoxysilane, butylethyldiethoxysilane, tert-butylmethyldiethoxysilane, hexylmethyldiethoxysilane, hexylethyldiethoxysilane, dodecylmethyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, vinylmethyldiethoxysilane, ethyltriisopropoxysilane, vinyltributoxysilane, phenyltri-tert-butoxysilane, 2-norbornantrimethoxysilane, 2-norbornantriethoxysilane, 2-norbornanmethyldimethoxysilane, trimethylphenoxysilane and methyltriallyloxysilane. Of these, preferred are tetraalkoxysilanes, and particularly preferred is tetra-n-butoxysilane.

Electron Donor Compound (②)

As the electron donor compound (②), there are exemplified (i) oxygen-containing electron donor compounds containing, for example, diethers, ketones, aldehydes, carboxylic acids, organic acid esters such as carboxylic acid esters, inorganic acid esters, organic acid amides, inorganic acid amides, organic acid anhydrides and inorganic acid anhydrides, and (ii) nitrogen containing electron donor compounds containing, for example, ammoniates, amines, nitriles and isocyanates. Among these electron donor compounds, carboxylic acid esters and diethers are enumerated as preferred examples. The compounds (②) may be used each alone or in combination with one another.

The carboxylic acid esters contain, for example, mono or polycarboxylic acid esters. Examples thereof are saturated aliphatic carboxylic acid esters, unsaturated aliphatic carboxylic acid esters, alicyclic carboxylic acid esters and aromatic carboxylic acid esters. Specific examples of the carboxylic acid esters are methyl acetate, ethyl acetate, phenyl acetate, methyl propionate, ethyl propionate, ethyl butyrate, ethyl valerate, ethyl acrylate, methyl methacrylate, ethyl zenzoate, butyl benzoate, methyl toluylate, ethyl toluylate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, diisopropyl phthalate, di-n-butyl phthalate, diisobutyl phthalate, di-n-octyl phthalate and diphenyl phthalate.

Among these carboxylic acid esters, preferred are unsaturated aliphatic carboxylic acid esters containing, for example, methacrylic acid esters and maleic acid esters; aromatic monocarboxylic acid esters containing, for example, benzoic acid esters; and aromatic polycarboxylic acid esters containing, for example, phthalic acid esters, more preferred are aromatic polycarboxylic acid esters and much more preferred are phthalic acid esters.

Preferred examples of the diether are those represented by the following formula,

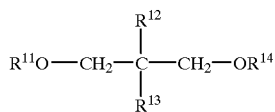

wherein $R^{11}$ to $R^{14}$ are independently of one another a straight chain alkyl group, branched alkyl group or alicyclic alkyl group having 1 to 20 carbon atoms, an aryl group having 6 to 20 carbon atoms, or an aralkyl group having 7 to 20 carbon atoms, provided that $R^{12}$ and/or $R^{13}$ may be hydrogen atom.

Specific examples of those represented by the foregoing formula are 2,2-diisobutyl-1,3-dimethoxypropane, 2-isopropyl-2-isopentyl-1,3-dimethoxypropane, 2,2-bis(cyclohexylmethyl)-1,3-dimethoxypropane, 2-isopropyl-2-3,7-dimethyloctyl-1,3-dimethoxypropane, 2,2-diisopropyl-1,3-dimethoxypropane, 2-isopropyl-2-cyclohexylmethyl-1,3-dimethoxypropane, 2,2-dicyclohexyl-1,3-dimethoxypropane, 2-isopropyl-2-isobutyl-1,3-dimethoxypropane, 2,2-dipropyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane and 2-heptyl-2-pentyl-1,3-dimethoxypropane.

With respect to the diethers represented by the foregoing formula, preferred are compounds having said formula wherein $R^{11}$ to $R^{14}$ are independently of one another the alkyl group, and more preferred are compounds having said formula wherein $R^{12}$ and $R^{13}$ are independently of one another a branched alkyl group or alicyclic alkyl group and $R^{11}$ and $R^{14}$ are independently of one another a straight chain alkyl group.

Titanium Compound (③)

A liquid titanium compound is preferred as the titanium compound (③) represented by the foregoing formula, $Ti(OR^8)_aX_{4-a}$, wherein $R^8$, X and "a" are as defined above.

Specific examples of the compounds represented by said formula are alkoxytitanium trihalides containing, for example, $Ti(OCH_3)Cl_3$, $Ti(OC_2H_5)Cl_3$, $Ti(OC_3H_7)Cl_3$, $Ti(O-n-C_4H_9)Cl_3$, $Ti(OC_2H_5)Br_3$ and $Ti(O-iso-C_4H_9)Br_3$; dialkoxytitanium dihalides containing, for example, $Ti(OCH_3)_2Cl_2$, $Ti(OC_2H_5)_2Cl_2$, $Ti(OC_3H_7)_2Cl_2$, $Ti(O-n-C_4H_9)_2Cl_2$, $Ti(OC_2H_5)_2Br_2$ and $Ti(O-iso-c_4h_9)_2 Br_2$; trialkoxytitanium halides containing, for example, $Ti(OCH_3)_3Cl$, $Ti(OC_2H_5)_3Cl$, $Ti(OC_3H_7)_3Cl$, $Ti(O-n-C_4H_9)_3Cl$, $Ti(OC_2H_5)_3Br$ and $Ti(O-iso-C_4H_9)_3 Br$; and tetraalkoxytitanium containing, for example, $Ti(OCH_3)_4$, $Ti(OC_2H_5)_4$, $Ti(OC_3H_7)_4$, $Ti(O-n-C_4H_9)_4$, $Ti(OC_2H_5)_4$ and $Ti(O-iso-C_4H_9)_4$. Of these, tetraalkoxytitanium compounds are particularly preferred.

These titanium compounds may be used each alone or in combination with one another in an optional ratio. In addition, these titanium compounds may be used in combination with titanium tetrahalides containing, for example, $TiCl_4$. Further, these titanium compounds may be diluted with hydrocarbons, halohydrocarbons or aromatic hydrocarbons before use.

Organomagnesium Compound (④)

As the organomagnesium compound (④), any type of organomagnesium compounds having an Mg-carbon bond can be used. Preferred examples of the compound (④) are a Grignard compound having the following formula,

wherein $R^{15}$ is an alkyl, aryl or aralkyl group having 1 to 8 carbon atoms, and X is a halogen atom; and a compound having the following formula,

wherein $R^{16}$ and $R^{17}$ are independently of one another an alkyl, aryl or aralkyl group having 1 to 20 carbon atoms. Of these, more preferred is the Grignard compound.

In the above two formulas, $R^{15}$, $R^{16}$ and $R^{17}$ contain, for example, methyl, ethyl, n-propyl, isopropyl, n-butyl, sec-butyl, amyl, isoamyl, n-hexyl, n-octyl, 2-ethylhexyl, phenyl and benzyl groups. $R^{16}$ and $R^{17}$ may be the same or different from one another.

Examples of the Grignard compound are methylmagnesium chloride, ethylmagnesium chloride, ethylmagnesium bromide, ethylmagnesium iodide, propylmagnesium chloride, propylmagnesium bromide, butylmagnesium chloride, butylmagnesium bromide, sec-butylmagnesium chloride, sec-butylmagnesium bromide, tert-butylmagnesium chloride, tert-butylmagnesium bromide, amylmagnesium chloride, isoamylmagnesium chloride, hexylmagnesium chloride, phenylmagnesium chloride and phenylmagnesium bromide.

Examples of the compound of the above formula, $R^{16}R^{17}Mg$, are dimethylmagnesium, diethylmagnesium, dipropylmagnesium, diisopropylmagnesium, dibutylmagnesium, di-sec-butylmagnesium, di-tert-butylmagnesium, butyl-sec-butylmagnesium, diamylmagnesium, dihexylmagnesium, diphenylmagnesium and butylethylmagnesium.

As a solvent used in the preparation of the compound (④), there are exemplified ether solvents containing, for example, diethyl ether, dipropyl ether, diisopropyl ether, dibutyl ether, diisobutyl ether, diamyl ether, diisoamyl ether, dihexyl ether, dioctyl ether, diphenyl ether, dibenzyl ether, phenetole, anisole, tetrahydrofuran and tetrahydropyran; and hydrocarbon solvents containing, for example, hexane, heptane, octane, cyclohexane, methylcyclohexane, benzene, toluene and xylene. These solvents may be used each alone, or may be used in combination of the ether solvents with one another, or in combination of the hydrocarbon solvents with one another, or in combination of the ether solvents and the hydrocarbon solvents with one another.

It is recommendable to use the compound (④) in the form of an ether solution. Examples of the ether compound used therefor are preferably those having six or more carbon atoms in the molecule, and those having a cyclic structure. It is particularly preferred to use an ether solution of the Grignard compound.

It is also possible to use the compound (④) in the form of a hydrocarbon soluble complex, which can be obtained by combining the compound (④) with an organometal compound. Examples of the organometal compound are those of Li, Be, B, Al or Zn.

Halogen Compound (⑤)

With respect to the metal in the halogen compound of a metal belonging to groups 4 to 6 of the periodic table, there are exemplified Ti, Zr, Hf, V, Nb, Ta, Cr, Mo and W. Preferred compounds (⑤) are halogen compounds of at least one transition metal selected from Ti, Zr and Hf. Particularly preferred compounds (⑤) are halogen compounds of tetravalent titanium. Preferred examples of the halogen compounds of tetravalent titanium are those having the following formula, $$Ti(OR^{18})_m X_{4-m}$$

wherein $R^{18}$ is an alkyl group having 1 to 20 carbon atoms, X is a halogen atom and "m" is a number satisfying $0 \leq m<4$.

In the above formula, preferred $R^{18}$ is an alkyl group having 1 to 8 carbon atoms.

Examples of the compound (⑤) are titanium tetrahalides containing, for example, titanium tetrachloride, titanium tetrabromide and titanium tetraiodide; alkoxytitanium trihalides containing, for example, methoxytitanium trichloride, ethoxytitanium trichloride, butoxytitanium trichloride, ethoxytitanium tribromide and isobutoxytitanium tribromide; dialkoxytitanium dihalides containing, for example, dimethoxytitanium dichloride, diethoxytitanium dichloride, dibutoxytitanium dichloride and diethoxytitanium dibromide; and trialkoxytitanium monohalides containing, for example, trimethoxytitanium chloride, triethoxytitanium chloride, tributoxytitanium chloride and triethoxytitanium bromide.

Among these compounds (⑤), preferred are titanium tetrahalides, and particularly preferred is titanium tetrachloride. The compounds (⑤) may be used each alone or in combination of two or more thereof. The compounds (⑤) may be diluted with a solvent containing, for example, hydrocarbons, halohydrocarbons and aromatic hydrocarbons before use.

Magnesium Compound (⑥) Having no Reducing Power

Preferred examples of the magnesium compound (⑥) are magnesium halides containing, for example, magnesium chloride, magnesium bromide, magnesium iodide and magnesium fluoride; alkoxymagnesium halides containing, for example, methoxymagnesium chloride, ethoxymagnesium chloride, isopropoxymagnesium chloride, butoxymagnesium chloride and octoxymagnesium chloride; aryloxymagnesium halides containing, for example, phenoxymagnesium chloride, methylphenoxymagnesium chloride and butoxyphenoxymagnesium chloride; alkoxymagnesium compounds containing, for example, methoxymagnesium, ethoxymagnesium, isopropoxymagnesium, butoxymagnesium and octoxymagnesium; aryloxymagnesium compounds containing, for example, phenoxymagnesium, methylphenoxymagnesium and butoxyphenoxymagnesium; and carboxylic acid salts containing, for example, magnesium laurate and magnesium stearate.

The compound (⑥) may be used in the form of a hydrocarbon soluble complex, which can be obtained by combining the compound (⑥) with an organometal compound. Examples of such organometal compound are those of Li, Be, B, Al or Zn.

Titanium Compound

As preferred examples of the titanium compound (⑦), there are enumerated titanium halide compounds having the following formula, $$Ti(OR^{19})_k X_{4-k}$$

wherein $R^{19}$ is a hydrocarbon group having 1 to 20 carbon atoms, X is a halogen atom and "k" is a number satisfying $0 \leq k<4$.

Specific examples of the compound (⑦) are titanium tetrahilides containing, for example, $TiCl_4$, $TiBr_4$ and $TiI_4$; alkoxytitanium trihalides containing, for example, $Ti(OCH_3)Cl_3$, $Ti(OC_2H_5)Cl_3$, $Ti(OC_3H_7)Cl_3$, $Ti(O\text{-}n\text{-}C_4H_9)Cl_3$, $Ti(OC_2H_5)Br_3$ and $Ti(O\text{-iso-}C_4H_9)Br_3$, dialkoxytitanium dihalides containing, for example, $Ti(OCH_3)_2Cl_2$, $Ti(OC_2H_5)_2 Cl_2$, $Ti(OC_3H_7)_2Cl_2$, $Ti(O\text{-}n\text{-}C_4H_9)_2Cl_2$, $Ti(OC_2H_5)_2Br_2$ and $Ti(O\text{-iso-}C_4H_9)_2Br_2$; and trialkoxytitanium halides containing, for example, $Ti(OCH_3)_3Cl$, $Ti(OC_2H_5)_3Cl$, $Ti(OC_3H_7)_3Cl$, $Ti(O\text{-}n\text{-}C_4H_9)_3Cl$, $Ti(OC_2H_5)_3Br$ and $Ti(O\text{-iso-}C_4H_9)_3Br$. Of these, preferred are titanium tetrahalides, and particularly preferred is $TiCl_4$.

The compound (⑦) may be used each alone or in combination of two or more thereof in an optional ratio. The compound (⑦) may be diluted with a solvent containing, for example, hydrocarbons, halohydrocarbons and aromatic hydrocarbons before use.

Production of Solid Catalyst Component (A)

With respect to the foregoing production process (i) for the solid catalyst component (A), following specific processes (a) to (f) are enumerated:

(a) a process comprising adding the titanium compound (③) of the foregoing formula, $Ti(OR^8)_a X_{4-a}$, to a mixture of the Si—O bond-carrying organosilicon compound (①) with the electron donor compound ((②)), contacting the resultant with the organomagnesium compound ((④)) to obtain a solid product (reduced solid product), and then treating the solid product with the halogen compound ((⑤)) of a metal belonging to the groups 4 to 6 of the periodic table;

(b) a process comprising adding the electron donor compound ((②)) to a mixture of the silicon compound ((①)) with the titanium compound ((③)), contacting the resultant with the organomagnesium compound ((④)) to obtain a solid product (reduced solid product), and then treating the solid product with the halogen compound ((⑤));

(c) a process comprising adding the silicon compound ((①)) to a mixture of the electron donor compound ((②)) with the titanium compound ((③)), contacting the resultant with the organomagnesium compound ((④)) to obtain a solid product (reduced solid product), and then treating the solid product with the halogen compound ((⑤));

(d) a process comprising adding a mixture of the electron donor compound ((②)) with the titanium compound ((③)) to the silicon compound ((④)), contacting the resultant with the organomagnesium compound ((④)) to obtain a solid product (reduced solid product), and then treating the solid product with the halogen compound ((⑤));

(e) a process comprising adding a mixture of the silicon compound ((①)) with the titanium compound ((③)) to the electron donor compound ((②)), contacting the resultant with the organomagnesium compound ((④)) to obtain a solid product (reduced solid product), and the treating the solid product with the halogen compound ((⑤)); and (f) a process comprising adding a mixture of the silicon compound ((①)) with the electron donor compound ((②)) to the titanium compound ((③)), contacting the resultant with the organomagnesium compound ((④)) to obtain a solid product (reduced solid product), and then treating the solid product with the halogen compound ((⑤)).

Of these examples, process (a) is recommendable from a viewpoint of a polymerization activity of the catalyst obtained.

Usually, the solid catalyst component (A) is produced in an atmosphere of an inert gas containing, for example, nitrogen and argon. A temperature of the reduction reaction between the titanium compound ((③)) and the organomagnesium compound ((④)) is usually from about –50° C. to 70° C., preferably from about –30° C. to 50° C., and more preferably from about –25° C. to 35° C. When the temperature is higher than about 70° C., particle property of the solid product obtained may be deteriorated. A temperature at the time of treating the resulting solid product with the halogen compound ((⑤)) is usually from about –50° C. to 200° C., preferably from about 30° C. to 150° C., and more preferably from about 60° C. to 130° C. When the temperature is higher than about 200° C., particle property of the solid product treated may be deteriorated.

With respect to the foregoing production process (ii) for the solid catalyst component (A), the titanium compound ((⑦)) and the electron donor compound ((②)) can be supported on the magnesium compound ((⑥)) having no reducing power by, for example, contacting a liquid mixture of the compound ((⑥)), the compound ((②)) and a hydrocarbon solvent with the titanium compound ((⑦)). The contacting is carried out at a temperature of usually from about –70° C. to 200° C., preferably from about –50° C. to 150° C., and more preferably from about –30° C. to 130° C.

In the above production processes (i) and (ii) for the solid catalyst component (A), it is possible to carry out the treatment in the presence of a porous substance containing, for example, porous inorganic oxides and porous organic polymers, thereby impregnating the porous substance with the solid product. Favorable porous substances are those having a porous volume of not less than about 0.3 ml/g in a porous radius of from about 20 to 200 nm and an average particle size of from about 5 to 300 μm.

Examples of the porous inorganic oxides are $SiO_2$, $Al_2O_3$, MgO, $TiO_2$, $ZrO_2$, a compound oxide of $SiO_2.Al_2O_3$, a compound oxide of $MgO.Al_2O_3$ and a compound oxide of $MgO.SiO_2.Al_2O_3$.

Examples of the porous organic polymers are polystyrene polymers containing, for example, polystyrene, styrene-divinylbenzene copolymer, styrene-N,N'-alkylene dimethacrylamide copolymer, styrene-ethyleneglycol dimethacrylate copolymer and ethylvinylbenzene-divinylbenzene copolymer; poly (meth)acrylic ester polymers containing, for example, polyethyl acrylate, methyl acrylate-divinylbenzene copolymer, ethyl acrylate-divinylbenzene copolymer, polymethyl methacrylate, methyl methacrylate-divinylbenzene copolymer and polyethyleneglycol dimethacrylate; polyacrylonitrile polymers containing, for example, polyacrylonitrile and acrylonitrile-divinylbenzene copolymer; polyvinyl chloride polymers containing, for example, polyvinyl chloride; polyvinylpyrrolidine; polyvinylpyridine; and polyolefin polymers containing, for example, polyethylene, ethylene-methyl acrylate copolymer and polypropylene. Among these porous substances, $SiO_2$, $Al_2O_3$ and styrene-divinylbenzene copolymer are enumerated as examples of favorable porous substances.

With respect to amounts to be used of respective compounds in the above production process (i) for the solid catalyst component (A), an amount of the electron donor compound ((②)) to the organomagnesium compound ((④)), namely, a molar ratio of the compound ((②))/the compound ((④)) is usually from about 0.0001 to 1, preferably from about 0.0005 to 0.6, and particularly preferably from about 0.001 to 0.1. An amount of the organosilicon compound ((①)) to the organomagnesium compound ((④)), namely, a molar ratio of the compound ((①))/the compound ((④)) is usually from about 0.1 to 10, preferably from about 0.2 to 5, and particularly preferably from about 0.5 to 2. An amount of the titanium compound ((③)) to the organosilicon compound ((①)), namely, a molar ratio of the compound ((③))/the compound ((①)) is usually from about 0.001 to 10, preferably from about 0.01 to 5, and particularly preferably from about 0.02 to 2. An amount of the halogen compound ((⑤)) is usually from about 10 to 10000 mol, preferably from about 30 to 5000 mol, and particularly preferably from about 100 to 3000 mol, per gram equivalent of a titanium atom in the trivalent titanium atom-containing solid product.

With respect to amounts to be used of respective compounds in the above production process (ii) for the solid catalyst component (A), an amount of the electron donor compound ((②)) to the magnesium compound ((⑥)), namely, a molar ratio of the compound ((②))/the compound ((⑥)) is usually from about 0.01 to 10, and preferably from about 0.1 to 5. An amount of the titanium compound ((⑦)) to the magnesium compound ((⑥)), namely, a molar ratio of the compound ((⑦))/the compound ((⑥)) is usually from about 0.01 to 1000, and preferably from about 0.1 to 200.

It is recommendable to wash the solid catalyst component (A) obtained with a hydrocarbon solvent at a temperature of usually from about 0 to 150° C., and preferably from about 60 to 130° C. As examples of preferred hydrocarbon solvents, aliphatic and aromatic hydrocarbon solvents are enumerated. Toluene is particularly preferred.

Organoaluminum Compound (B)

The organoaluminum compound (B) used in the present invention is that having at least one Al-carbon bond in the molecule. As specific examples of the compound (B), compounds having the following formulas are enumerated:

$$R^{20}{}_rAlX_{3-r}$$

$$R^{21}R^{22}Al-O-AlR^{23}R^{24}$$

wherein $R^{20}$ to $R^{24}$ are hydrocarbon groups having 1 to 20 carbon atoms, X is a halogen atom, a hydrogen atom or an alkoxy group, and "r" is a number satisfying $2 \leq r \leq 3$.

Examples of the compound (B) are trialkylaluminums containing, for example, triethylaluminum, triisobutylaluminum and trihexylalumium; dialkylaluminum hydrides containing, for example, diethylaluminum hydride and diisobutylaluminum hydride; dialkylaluminum halides containing, for example, diethylaluminum chloride; a blend of trialkylaluminums and dialkylaluminum halides containing, for example, a blend of triethylaluminum and diethylaluminum chloride; and alkylalumoxanes containing, for example, tetraethyldialumoxane and tetrabutyldialumoxane.

Among these organoaluminum compounds (B), preferred are trialkylaluminums, a blend of trialkylaluminums and dialkylaluminum halides and alkylalumoxanes, and particularly preferred are triethylaluminum, triisobutylaluminum, a blend of triethylaluminum and diethylaluminum chloride and tetraethyldialumoxane.

Process for Producing Olefin Polymer

A process for producing an olefin polymer in accordance with the present invention comprises polymerizing an olefin in the presence of the foregoing catalyst for olefin polymerization. The process in accordance with the present invention can be applied particularly preferably for the production of an isotactic α-olefin polymer.

The α-olefin contains those having not less than 3 carbon atoms. Examples of the α-olefin are straight chain mono-olefins containing, for example, propylene, butene-1, pentene-1, hexene-1, heptene-1, octene-1 and decene-1; branched mono-olefins containing, for example, 3-methylbutene-1,3-methylpentene-1 and 4-methylpentene-1; and vinylcyclohexane. These α-olefins maybe used each alone or in combination of two or more.

In the present invention, homopolymerization of propylene, homopolymerization of butene-1, copolymerization of a mixed olefin comprising a predominant amount of propylene and copolymerization of a mixed olefin comprising a predominant amount of butene-1 are preferred. Homopolymerization of propylene and copolymerization of a mixed olefin comprising a predominant amount of propylene (for example, a mixed olefin of propylene and ethylene and a mixed olefin of propylene and butene-1) are particularly preferred.

According to the copolymerization in accordance with the present invention, it is possible to copolymerize ethylene with two or more kinds of α-olefins selected from the foregoing α-olefins. It is further possible to copolymerize the α-olefin with a compound having multiple unsaturated bonds, which contains, for example, conjugated dienes and non-conjugated dienes, if desired, in combination with ethylene. With respect to a step of the copolymerization, not only one step copolymerization but also a multiple step copolymerization comprising two or more steps can be applied.

How to supply the solid catalyst component (A), the organoaluminum compound (B) and the catalyst component (C) into a polymerization zone is not particularly limited, provided that the supply is carried out in an atmosphere of an inert gas containing, for example, nitrogen and argon under substantially no water condition. An order of supplying the solid catalyst component (A), the organoaluminum compound (B) and the catalyst component (C) into a polymerization zone is also not particularly limited. For example, they may be individually supplied, or the one prepared in advance by contacting two of them and the remaining one may be supplied one by one.

With respect to the polymerization to be carried out to obtain the desired olefin polymer, which is hereinafter referred to as "present polymerization", in addition to said present polymerization to be carried out in the presence of the aforementioned catalyst, it is also possible to carry out polymerization in a manner such that a small amount of an olefin is polymerized in advance in the presence of the solid catalyst component (A) and the organoaluminum compound (B), which polymerization is hereinafter referred to as "preliminary polymerization" and is mentioned hereinafter in detail, thereby obtaining a catalyst which surface is covered with a small amount of the resulting olefin polymer, and then said present polymerization is carried out in the presence of the resulting catalyst.

The olefin used for the preliminary polymerization may be the same as or different from that used for the present polymerization. An amount of the olefin to be used for the preliminary polymerization is usually from about 0.01 to 1000 g, preferably from about 0.05 to 500 g, and particularly preferably from about 0.1 to 200 g, per gram of the component (A).

It is recommendable to carry out the preliminary polymerization in a manner such that a small amount of the olefin is subjected to slurry polymerization in the presence of the solid catalyst component (A) and the organoaluminum compound (B). Examples of a solvent used for the preliminary polymerization are inert hydrocarbons containing, for example, propane, butane, isobutane, pentane, isopentane, hexane, heptane, octane, cyclohexane, benzene and toluene, and liquid olefins. As an example of a mixed solvent, a combination of a large amount of the inert hydrocarbon solvent and a small amount of the liquid olefin can be enumerated.

An amount of the organoaluminum compound (B) to be used for the preliminary polymerization can be selected from a wide range of from about 0.5 to 700 mol, preferably from about 0.8 to 500 mol, and particularly preferably from about 1 to 200 mol, per gram equivalent of a titanium atom in the solid catalyst component (A). A concentration of the slurry in a manner of slurry polymerization is preferably from about 1 to 500 g-component (A)/litter-solvent, and particularly preferably from about 3 to 300 g-component (A)/litter-solvent. A temperature in the preliminary polymerization is preferably from about −20 to 100° C., and particularly preferably from about 0 to 80° C. A partial pressure of a gas phase olefin during the preliminary polymerization is preferably from about 0.01 to 20 kg/cm², and particularly preferably from about 0.1 to 10 kg/cm², provided that the olefin in a state of liquid under pressure and temperature of the preliminary polymerization is out of it. A time of the preliminary polymerization is not particularly limited, but favorably from about 2 minutes to 15 hours.

In the preliminary polymerization, the solid catalyst component (A), the organoaluminum compound (B) and the olefin can be supplied into a polymerization zone, for example, in a manner such that a contact product between the solid catalyst component (A) and the organoaluminum compound (B) and the olefin are supplied one by one; or a contact product between the solid catalyst component (A) and the olefin and the organoaluminum compound (B) are supplied one by one. The olefin can be supplied thereinto, for example, by successively supplying it while keeping the pressure in the polymerization zone to a predetermined degree; or by supplying all predetermined amounts thereof at a first stage. In order to regulate a molecular weight of the olefin polymer obtained, a chain transfer agent containing, for example, hydrogen may be used.

If desired, the solid catalyst component (A) and the organoaluminum compound (B) which are to be used for the preliminary polymerization can be used in combination with a partial or whole amount of the catalyst component (C) to be used for the present polymerization. The catalyst component (C) can be used in an amount of usually from about 0.01 to 400 mol, preferably from about 0.02 to 200 mol, and particularly preferably from about 0.03 to 100 mol, per gram equivalent of a titanium atom in the solid catalyst component (A), and usually from about 0.003 to 5 mol, preferably from about 0.005 to 3 mol, and particularly preferably from about 0.01 to 2 mol, per mol of the organoaluminum compound (B).

With respect to order of supplying the solid catalyst component (A), the organoaluminum compound (B) and the catalyst component (C) into a polymerization zone, they may be supplied individually, or a contact product between the two of them, for example, a contact product between the organoaluminum compound (B) and the catalyst component (C), and the remaining one may be supplied one by one.

While, an amount of the organoaluminum compound (B) to be used for the present polymerization can be selected from a wide range of from about 1 to 1000 mol, and particularly preferably from about 5 to 600 mol, per gram equivalent of a titanium atom in the solid catalyst component (A).

An amount of the catalyst component (C) to be used in the present polymerization is usually from about 0.1 to 2000 mol, preferably from about 0.3 to 1000 mol, and particularly preferably from about 0.5 to 800 mol, per gram equivalent of a titanium atom in the solid catalyst component (A), and usually from about 0.001 to 5 mol, preferably from about 0.005 to 3 mol, and particularly preferably from about 0.01 to 1 mol, per mol of the organoaluminum compound (B).

A temperature in the present polymerization is usually from about −30 to 300° C., and preferably from about 20 to 180° C. A pressure in the present polymerization is not particularly limited, but usually from atmospheric pressure to about 100 kg/cm$^2$, and preferably from about 2 to 50 kg/cm$^2$ from an industrial and economical point of view. A form of the present polymerization may be any of batch or continuous process. The present polymerization can be carried out by a slurry polymerization or solution polymerization process, wherein an inert hydrocarbon solvent containing, for example, propane, butane, isobutane, pentane, hexane, heptane and octane is used, or by a gas phase polymerization process, or by a bulk polymerization process wherein an olefin which is liquid at a polymerization temperature is used as a polymerization medium.

In the present polymerization, a chain transfer agent containing, for example, hydrogen may be added to regulate a molecular weight of the olefin polymer obtained. In the present invention, a molecular weight of the olefin polymer can be regulated easily by adding a small amount of hydrogen, so that the molecular weight of the desired olefin polymer can be decreased while inhibiting by-production of the amorphous polymer.

According to the present invention, there can be provided (i) an olefin polymerization catalyst, which has a high polymerization activity and a high stereospecificity so that no removal of amorphous polymers is required, and moreover which is capable of regulating the molecular weight of an olefin polymer obtained without lowering the stereospecificity thereof, (ii) a catalyst component (C) of a specific organosilicon compound used for producing said catalyst, (iii) a process for producing an olefin polymer using said catalyst, and (iv) use of said organosilicon compound as a component for producing an olefin polymerization catalyst. Thus, the present invention can be greatly valuable from an industrial point of view.

EXAMPLES

The present invention is illustrated in more detail with reference to the following Examples, which are only illustrative and not to be construed to limit the scope of the present invention.

How to evaluate various properties of polymers, solid products and components is as follows.

1. CXS (Cold Xylene Soluble)

CXS, that is expressed in terms of percentage (wt %), means a portion which is contained in the polymer and soluble in xylene at 20° C. In general, the lower the value of CXS, the lower the content of amorphous polymers in the polymer and the higher the stereospecificity of the polymer.

2. Intrinsic Viscosity (Referred to as "[η]")

Intrinsic viscosity of the polymer was measured in a tetralin solvent at 135° C.

3. Bulk Density

Bulk density of the polymer was measured according to JIS K-6721-1966.

4. Composition Analysis (1) A content of Ti contained in the solid product and the solid catalyst component (A) was determined in a manner such that a solid sample was decomposed with a dilute sulfuric acid, followed by addition of an excess amount of an aqueous hydrogen peroxide solution, thereby obtaining a liquid sample, a characteristic absorption at 410 nm of the liquid sample was measured by a double beam spectrophotometer U-2001 (a commercial name) manufactured by Hitachi Co., Ltd., and then the Ti content was determined using a calibration curve prepared separately.

(2) A content of an alkoxy group contained in the solid product and the solid catalyst component (A) was determined in a manner such that a solid sample was decomposed with water to obtain a liquid sample, and then the liquid sample was analyzed by a gas chromatography internal standard method to find the content as a content of the corresponding alcohol.

(3) A content of the electron donor contained in the solid product and the solid catalyst component (A) was determined in a manner such that a solid sample was decomposed with water to obtain a liquid sample, from which a soluble portion was extracted with a saturated hydrocarbon solvent, and then the extract was analyzed by a gas chromatography internal standard method.

Example 1

(a) Production of Reduced Solid Product

A 500 ml flask equipped with a stirrer and a dropping funnel was purged with nitrogen, and thereafter 270 ml of hexane, 7.5 ml (22 mmol) of tetra-n-butoxytitanium (the compound ((③))), 2.5 ml (9.3 mmol) of diisobutyl phthalate (the compound (②)) and 74 ml (329 mmol) of tetraethoxysilane (the compound (①)) were fed therein to obtain a uniform solution. Successively, 172 ml of a di-n-butyl ether solution of n-butylmagnesium chloride (concentration of n-butylmagnesium chloride=2.1 mmol/ml) manufactured by Yuki Gosei Kogyo Co., Ltd. was dropwise added to the uniform solution gradually for a period of 3 hours from the dropping funnel while keeping an inner temperature of the flask at 5° C. After completion of the addition, the reaction mixture was stirred for 30 minutes at 5° C., and thereafter further stirred for 1.5 hours at 35° C. Thereafter, the reaction mixture was cooled to room temperature, and then a solid was separated from the mixture. The solid separated was washed three times with each 200 ml of toluene, thereby obtaining a reduced solid product. The reduced solid product was mixed with 200 ml of toluene to obtain a slurry of 0.155 g/ml concentration. A part of the slurry sampled was subjected to composition analysis. As a result, contents of a titanium atom, a phthalic acid ester, an ethoxy group and a butoxy group in the reduced solid product were found to be 1.88 wt %, 0.19 wt %, 38.4 wt % and 3.21 wt %, respectively.

(b) Synthesis of Solid Catalyst Component (A)

A 100 ml flask equipped with a stirrer, a dropping funnel and a thermometer was purged with nitrogen, 51.7 ml of the reduced solid product slurry obtained in the above (1) was placed therein, and 25.1 ml of a supernatant liquid thereof was drawn out. To the reduced solid product slurry were added a mixture of 0.8 ml (4.73 mmol) of di-n-butyl ether (the compound (②)) with 16 ml (0.146 mol) of titanium tetrachloride (the compound (⑤)) and 1.6 ml (11.1 mmol) (corresponds to 0.20 ml-phthalic chloride/g-solid product) of phthalic acid chloride (the compound (②)) in this order. A temperature was raised to 115° C., and the resulting mixture was stirred at 115° C. for 3 hours. After completion of stirring, a solid was separated from the mixture at 115° C., and then washed twice with each 40 ml of toluene at 115° C. Successively, to the solid was added a mixture of 10 ml of toluene, 0.45 ml (1.68 mmol) of diisobutyl phthalate (the compound (②)), 0.8 ml (4.73 mmol) of di-n-butyl ether (the compound (②)) and 8 ml (0.073 mol) of titanium tetrachloride (the compound (⑤)), and the resulting mixture was stirred at 115° C. for 1 hour. After completion of stirring, a solid was separated from the mixture at 115° C., and washed twice with each 40 ml of toluene at 115° C. Successively, to the solid was added a mixture of 10 ml of toluene, 0.8 ml (4.73 mmol) of di-n-butyl ether (the compound (②)) and 8 ml (0.073 mol) of titanium tetrachloride (the compound (⑤)), and the resulting mixture was stirred at 115° C for 1 hour. After completion of stirring, a solid was separated from the mixture at 115° C., washed three times with each 40 ml of toluene at 115° C., and further washed three times with each 40 ml of hexane. The solid washed was dried under reduced pressure to obtain 7.10 g of a solid catalyst component (A-1).

It was found that contents of a titanium atom, a phthalic acid ester, an ethoxy group and a butoxy group in the solid catalyst component (A-1) were 2.00 wt %, 9.26 wt %, 0.04 wt % and 0.16 wt %, respectively.

(c) Polymerization of Propylene

A 3 litter agitation type stainless steel-made autoclave was purged with argon, and 2.6 mmol of triethylaluminum (the organoaluminum compound (B), 0.26 mmol of dicyclobutyldimethoxysilane (the catalyst component (C): synthesized by Shin-Etsu Chemical Co., Ltd.) and 5.3 mg of the solid catalyst component (A-1) obtained in the above (b) were fed therein. Thereafter, hydrogen in an amount corresponding to a partial pressure of 0.33 kg/cm2 was added thereto. Successively, 780 g of liquefied propylene was fed therein, and a temperature of the autoclave was raised to 80° C. The polymerization was continued at 80° C. for 1 hour. After completion of the polymerization, unreacted monomer (propylene) was purged from the reaction mixture. The resulting polymer was dried under reduced pressure at 60° C. for 2 hours to obtain 271 g of polypropylene powder.

Taking 5.3 mg, the amount of the solid catalyst component (A-1) used, and 271 g, the amount of the polypropylene powder obtained, into account, a yield of polypropylene per g of the solid catalyst component (A-1), which is hereinafter referred to as "PP/Cat", was found to be 51,100 (g/g) (PP/Cat=271 g/5.3 mg=51,100). With respect to the polypropylene obtained, CXS, intrinsic viscosity [η] and bulk density thereof were 0.30 (wt %), 2.53 and 0.470 (g/ml), respectively.

Comparative Example 1

Polymerization of propylene was carried out in a manner similar to that of Example 1(c), except that dicyclobutyldimethoxysilane (the catalyst component (C)) was replaced with tert-butyl-n-propyldimethoxysilane (a compound not satisfying the foregoing formula (1)). The results are as shown in Table 1.

Comparative Example 2

Polymerization of propylene was carried out in a manner similar to that of Example 1(c), except that dicyclobutyldimethoxysilane (the catalyst component (C) was replaced with dicyclopentyldimethoxysilane (a compound not satisfying the foregoing formula (1)). The results are as shown in Table 1.

Example 2

(a) Synthesis of Solid Catalyst Component (A)

A 500 ml flask equipped with a stirrer, a dropping funnel and a thermometer was purged with nitrogen, and therein were placed 31.74 g of MgCl$_2$ (the Magnesium compound (⑥)) manufactured by Aldrich Co., 167 ml of n-decane and 157 ml of 2-ethylhexyl alcohol, and then stirring was started. Under stirring, the mixture was heated to 130° C., and kept at 130° C. for 2 hours. Thereafter, 7.54 g of phthalic acid anhydride (the electron donor compound (②)) was added thereto, and the mixture was stirred at 130° C. for 1 hour. The reaction mixture was cooled to room temperature, and then was dropwise added into 1330 ml of titanium tetrachloride (the titanium compound (⑦)) kept at −20° C. under stirring for a period of 2 hours. After completion of dropping, the temperature was raised under stirring from −20° C. to room temperature for a period of 1 hour and a half. After confirming completion of the reaction, the temperature was further raised under stirring from room temperature to 110° C. for a period of 2 hours and a half, and thereafter, 17.9 ml of disobutyl phthalate (the electron donor compound (②)) was added thereto. The mixture was stirred at 110° C. for 2 hours, and thereafter, a solid was separated from the reaction mixture at that temperature. Then, 1330 ml of titanium tetrachloride (the titanium compound (⑦)) was added to the solid obtained, and the mixture was stirred at 110° C. for 2 hours. After stirring, a solid was separated from the mixture, and the solid separated was washed three times with each 200 ml of IP SOLVENT 2028 (a commercial name) manufactured by Idemitsu Petrochemical Co., Litd. The resulting solid was further washed three times with each 200 ml of n-hexane, and then was dried under reduced pressure at 40° C., thereby obtaining 37.9 g of a solid catalyst component (A-2). A content of titanium atom in the solid catalyst component (A-2) was found to be 1.72 wt %.

(b) Polymerization of Propylene

Polymerization of propylene was carried out in a manner similar to that of Example 1(c), except that the solid catalyst component (A-1) was replaced with the solid catalyst component (A-2). The results are as shown in Table 1.

Comparative Example 3

Polymerization of propylene was carried out in a manner similar to that of Example 1(c), except that the solid catalyst component (A-2) and dicyclopentyldimethoxysilane (a compound not satisfying the foregoing formula (1)) were used in place of the solid catalyst component (A-1) and dicyclobutyldidimethoxysilane (the catalyst component (C)), respectively. The results are as shown in Table 1.

TABLE 1

|  | Organosilicon compound | Polymerization activity (g-PP/g-cat) | CXS (wt %) | [η] (dl/g) | Bulk density (g/ml) |
|---|---|---|---|---|---|
| Example 1 | Dicyclobutyl-dimethoxy-silane | 51,100 | 0.30 | 2.53 | 0.407 |
| Comparative Example 1 | t-Butyl-n-propyl-dimethoxy-silane | 50,000 | 0.44 | 3.36 | 0.403 |
| Compararive Example 2 | Dicyclo-pentyldi-methoxysilane | 50,000 | 0.32 | 3.54 | 0.402 |
| Example 2 | Dicyclobutyl-dimethoxy-silane | 36,000 | 1.5 | 2.30 | 0.444 |
| Comparative Example 3 | Dicyclo-pentyidi-methoxysilane | 35,000 | 1.3 | 2.38 | 0.446 |

What is claimed is:

1. A process for producing a catalyst for olefin polymerization, which comprises the step of contacting:
   (i) a solid catalyst component (A) containing magnesium atom, titanium atom, halogen atom and an electron donor compound;
   (ii) an organoaluminum compound (B); and
   (iii) a catalyst compound (C), which is an organosilicon compound represented by the following formula (1),

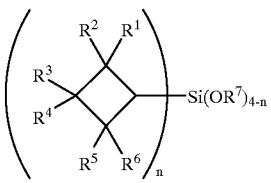

wherein n is 1 or 2; $R^1$, $R^2$, $R^3$, $R^4$, $R^5$ and $R^6$ are independently of one another a hydrogen atom, a halogen atom or a hydrocarbon group, or may be bonded with one another to form a ring; $R^7$ is a hydrocarbon group; and when n is 2, two $R^1$s, $R^2$s, $R^3$s, $R^4$s, $R^5$s and $R^6$s may be the same or different.

2. The process for producing a catalyst for olefin polymerization according to claim 1, wherein n is 2.

3. The process for producing a catalyst for olefin polymerization according to claim 1, wherein the solid catalyst component (A) comprises a solid catalyst component obtained by a process comprising the steps of:
   (i) reducing a titanium compound ((3)) represented by the following formula, $$Ti(OR^8)_aX_{4-a}$$

wherein $R^8$ is a hydrocarbon group having 1 to 20 carbon atoms, X is a halogen atom and a is a number satisfying $0 < a \leq 4$, with an organomagnesium compound ((4)) in the presence of an Si—O bond-carrying organosilicon compound ((1)), thereby obtaining a trivalent titanium atom-containing solid product; and
   (ii) treating the solid product with a halogen compound ((5)) of a metal belonging to groups 4 to 6 of the periodic table.

4. The process for producing a catalyst for olefin polymerization according to claim 1, wherein the solid catalyst component (A) comprises a solid catalyst component obtained by a process comprising the step of supporting a titanium compound ((7)) and an electron donor compound ((2)) on a magnesium compound ((6)) having no reduction power.

* * * * *